United States Patent
Nakamura

(10) Patent No.: US 9,104,649 B2
(45) Date of Patent: Aug. 11, 2015

(54) INFORMATION PROCESSING APPARATUS AND PROGRAM

(75) Inventor: Kuniki Nakamura, Gifu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/327,457

(22) Filed: Dec. 15, 2011

(65) Prior Publication Data

US 2012/0159293 A1 Jun. 21, 2012

(30) Foreign Application Priority Data

Dec. 15, 2010 (JP) ................. 2010-278932

(51) Int. Cl.
*G06F 17/22* (2006.01)
*G06F 17/24* (2006.01)

(52) U.S. Cl.
CPC ........ *G06F 17/2247* (2013.01); *G06F 17/2229* (2013.01); *G06F 17/24* (2013.01)

(58) Field of Classification Search
CPC .............................. G06F 17/212; G06F 17/20
USPC ......................................................... 715/202
See application file for complete search history.

(56) References Cited

U.S. PATENT DOCUMENTS

| | | | |
|---|---|---|---|
| 6,857,102 B1 | 2/2005 | Bickmore et al. | |
| 8,260,090 B2 * | 9/2012 | Ebato et al. | 382/305 |
| 2003/0053145 A1 * | 3/2003 | Nakane | 358/452 |
| 2006/0228096 A1 * | 10/2006 | Hoshino et al. | 386/46 |
| 2006/0232836 A1 * | 10/2006 | Yamada et al. | 358/527 |
| 2006/0294469 A1 | 12/2006 | Sareen et al. | |
| 2007/0055931 A1 | 3/2007 | Zaima et al. | |
| 2007/0229491 A1 * | 10/2007 | Saitoh | 345/418 |
| 2008/0018917 A1 * | 1/2008 | Zhang | 358/1.5 |

(Continued)

FOREIGN PATENT DOCUMENTS

| | | |
|---|---|---|
| EP | 0949571 A2 | 10/1999 |
| JP | 2000-076155 A | 3/2000 |
| JP | 2005-182735 A | 7/2005 |

(Continued)

OTHER PUBLICATIONS

Anonymous, "remove all images", Oct. 18, 2010, Retrieved from the Internet: URL:http://www.mobileread.com/forums/showthread.php?t=103003 [retrieved on Sep. 21, 2012].

(Continued)

*Primary Examiner* — James J Debrow
(74) *Attorney, Agent, or Firm* — Merchant & Gould PC

(57) ABSTRACT

An information processing apparatus is configured to generate second document data described in a markup language and represents at least a sentence, from first document data described in the markup language and represents a sentence and a plurality of images. The information processing apparatus includes a list screen creating unit configured to create a list screen that includes the plurality of images which can be represented and allows a user to select each of the plurality of images and is configured to display the list screen on a display unit; and a document data creating unit configured to use the first document data to create the second document data in which at least one of the plurality of images included in the list screen is not represented, in response to an instruction input from the user through the list screen.

16 Claims, 13 Drawing Sheets

(56) References Cited

U.S. PATENT DOCUMENTS

| | | | |
|---|---|---|---|
| 2008/0031547 A1* | 2/2008 | Kawachi | 382/305 |
| 2008/0226198 A1* | 9/2008 | Ebato et al. | 382/305 |

FOREIGN PATENT DOCUMENTS

| | | |
|---|---|---|
| JP | 2006-277056 A | 10/2006 |
| JP | 2006-277196 A | 10/2006 |
| JP | 2007-094950 A | 4/2007 |
| JP | 2008-154091 A | 7/2008 |
| JP | 2009-070169 A | 4/2009 |

OTHER PUBLICATIONS

"Recommended Specification: Open Publication Structure (OPS)—Open Packaging Format (OPF)—Open Container Format (OCF)", International Digital Publishing Forum (IDPF), Sep. 4, 2010, pp. 1-50, Retrieved from the Internet: URL:http://old.idpf.org/specs.htm [retrieved on Jul. 6, 2011].

Schember, John, "The ABCs of e-book format conversion: Easy Calibre tips for the Kindle, Sony and Nook", Jan. 3, 2010, Retrieved from the Internet: URL:http:/www.teleread.com/drm/the-abcs-of-format-conversion-for-the-kindle-sony-and-nook-plus-some-calibre-tips/ [retrieved on Sep. 21, 2012].

Agarwal, Suprotim, "Check/Uncheck all items in a CheckBoxList using ASP.NET and Javascript", Sep. 16, 2007, Retrieved from the Internet: URL:http://www.dotnetcurry.com/ShowArticle.aspx?ID=77 [retrieved on Sep. 21, 2012].

Anonymous, "How to print Acrobat PDF file without the images", Oct. 12, 2010, Retrieved from the Internet: URL: http://superuser.com/questions/198644/how-to-print-acrobat-pdf-file-without-the-images [retrieved on Sep. 21, 2012].

European Patent Office, extended European Search Report for European Patent Application No. 11193572.2 (counterpart European patent application), dated Oct. 1, 2012.

Japan Patent Office, Notification of Reasons for Refusal for Japanese Patent Application No. 2010-278932 (counterpart to above-captioned patent application), mailed Dec. 24, 2013.

Q&A Corporation, Method for Deleting Extra Portion Such as Advertisement in Printing a Site, Japan, Online, Oct. 1, 2008 (search date Dec. 6, 2013), http://www.724685.com/weekly/qa081001.htm.

Japan Patent Office, Notification of Reasons for Refusal for Japanese Patent Application No. 2010-278932 (counterpart to above-captioned patent application), mailed Mar. 11, 2014.

Office Action from related Japanese Patent Application No. 2010-278932 mailed Sep. 9, 2014.

\* cited by examiner

[X AND Y ARE NATURAL NUMBERS]

FIG. 3

```
<!DOCTYPE HTML PUBLIC "-//W3C//DTD HTML 4.01 Transitional//EN">
<html>
<head>
<title></title>
<style type="text/css"">
<!--
M4 →   img.sample { width: 100%; height: 100%; }
-->
</style>
</head>
<body>
M1 →   A, B, C, D, E
        .
        .
        .
M2 →   <p><img src="../img/dummy.png" class="img.sample" alt=IMAGE1></p>
M3 →   F, G, H, I, J
        .
        .
        .
</body>
</html>
```

*FIG. 4*

```
<!DOCTYPE HTML PUBLIC "-//W3C//DTD HTML 4.01 Transitional//EN">
<html>
<head>
<title></title>
<style type="text/css"">
<!--
img.sample { width: 100%; height: 100%; }
-->
</style>
</head>
<body>
A, B, C, D, E
.
.
.
```

M2 → ~~<p><img src="../img/dummy.png" class="img.sample" alt=IMAGE1"></p>~~

```
F, G, H, I, J
.
.
.
</body>
</html>
```

CREATE HTML FILE FROM WHICH
THIS DESCRIPTION IS DELETED

INFORMATION PROCESSING APPARATUS AND PROGRAM

CROSS REFERENCE TO RELATED APPLICATION

The present application claims priority from Japanese Patent Application No. 2010-278932, which was filed on Dec. 15, 2010, the disclosure of which is herein incorporated by reference in its entirety.

TECHNICAL FIELD

The present invention relates to a technique that outputs a document described in a markup language.

BACKGROUND

A technique has been known which selects and outputs only a necessary region in a page when document data described in a Web page is output.

For example, Patent Document 1 discloses an image forming apparatus which cuts off and selects a region required for printing from a screen on which the content of a file is displayed and prints only the necessary region in the file.

RELATED ART DOCUMENT

Patent Document

[Patent Document 1] JP-A-2006-277056

SUMMARY

However, in the technique that cuts off the region required for printing, the user needs to select a portion to be cut off from the page. Therefore, it takes a lot of time and effort for the user to select a necessary region. The invention has been made in order to solve the above-mentioned problems and an object of the invention is to provide a technique for easily outputting a document in which the image that the user does not want to output is not represented when the document is output.

In order to achieve the object, according to a first aspect of the invention, there is provided an information processing apparatus that generates second document data which is described in a markup language and represents at least a sentence when the second document data is output, from first document data which is described in the markup language and represents a sentence and a plurality of images when the first document data is output. The information processing apparatus includes: a list screen creating unit for creating a list screen that includes the plurality of images which can be represented when the first document data is output and allows a user to select each of the plurality of images and displaying the list screen on a display unit; and a document data creating unit for using the first document data to create the second document data in which at least one of the plurality of images included in the list screen is not represented when the second document data is output, in response to an instruction input from the user through the list screen.

According to this structure, when the second document data is created from the first document data, the list screen including a plurality of images is displayed. The user can easily select the image that is desired to be represented when the images are output or the image that is not desired to be represented when the images are output from a plurality of images and instruct the output of the images, while viewing the list screen. As a result, it is possible to easily output a document in which the image which is not required for printing is not represented.

In the above-mentioned apparatus, the document data creating unit may create the second document data in which all of the plurality of images in the list screen created by the list screen creating unit are not represented when the second document data is output, in response to the instruction from the user.

According to this structure, it is possible to create document data such that all of the images in the list screen are not represented when the document data is output. Therefore, it is possible to reduce time and effort required for the user to separately select the images.

According to a second aspect of the invention, there is provided an information processing apparatus including: a data creating unit for creating second document data which is described in a markup language and represents a sentence without representing a plurality of images when the second document data is output, from first document data which is described in the markup language and represents the sentence and the plurality of images when the first document data is output; and a selection allowing unit for allowing a user to select whether to create the second document data from the first document data before the second document data is created.

According to this structure, when a file is output without using image data, the user can acquire a desired file without time and effort to select an image from the list. That is, it is possible to easily output document data in which an image is not represented when the document data is output.

The invention can be achieved through various aspects, such as an information processing apparatus, a method performed by the information processing apparatus, a computer program for implementing the function of the method and the apparatus, and a recording medium having the computer program recorded thereon.

BRIEF DESCRIPTION OF THE DRAWINGS

Illustrative aspects of the invention will be described in detail with reference to the following figures wherein:

FIG. 3 is a diagram illustrating the structure of an HTML file;

FIG. 4 is a diagram illustrating a file structure in which a character string is edited such that an image is not represented in the HTML file;

DETAILED DESCRIPTION OF EXEMPLARY EMBODIMENTS OF THE PRESENT INVENTION

Hereinafter, exemplary embodiments of the invention will be described with reference to the accompanying drawings.

First Embodiment

Structure of System

Figure 1:
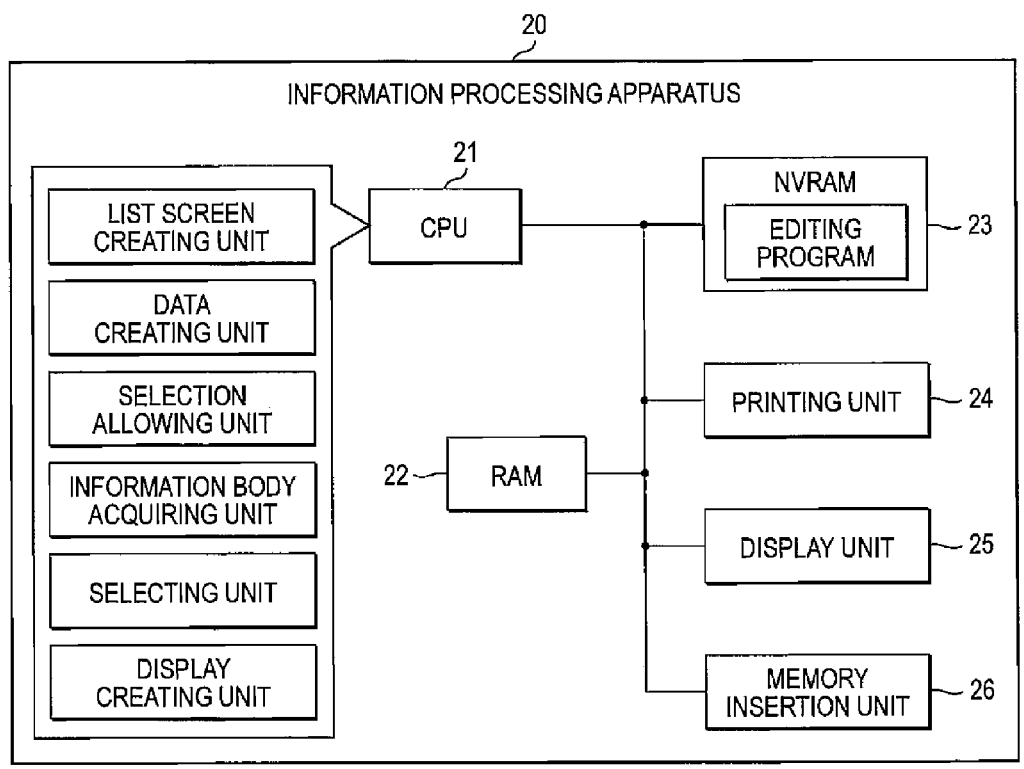
FIG. 1 is a block diagram illustrating the structure of a printer according to an embodiment.

FIG. 1 is a block diagram illustrating the schematic structure of a printer 20 according to a first embodiment.
(Printer)

The printer 20 includes a CPU 21, a RAM 22, an NVRAM 23, a printing unit 24, a display unit 25, and a memory insertion unit 26.

The CPU 21 controls the operation of the printer 20. In this embodiment, the NVRAM 23 stores an editing program for editing an HTML file. The CPU 21 reads the editing program stored in the NVRAM 23, stores the editing program in the RAM 22, and executes the editing program. In this way, the CPU 21 can control the editing of a print image by the printer 20.

The display unit 25 is a user interface that includes a panel and displays various kinds of screens. In this embodiment, the display unit 25 is a touch panel and functions as an operation unit. The user touches a portion of the screen displayed on the display unit 25 to select an item. Alternatively, the display unit 25 may not be a touch panel. In this case, the user presses an operation unit (button) for selecting an item of the display unit 25 to select the item.

The memory insertion unit 26 is an insertion hole into which a portable memory, such as a USB memory, is inserted. The CPU 21 reads information stored in the portable memory through the memory insertion unit 26.
(ePUB)

Figure 2:
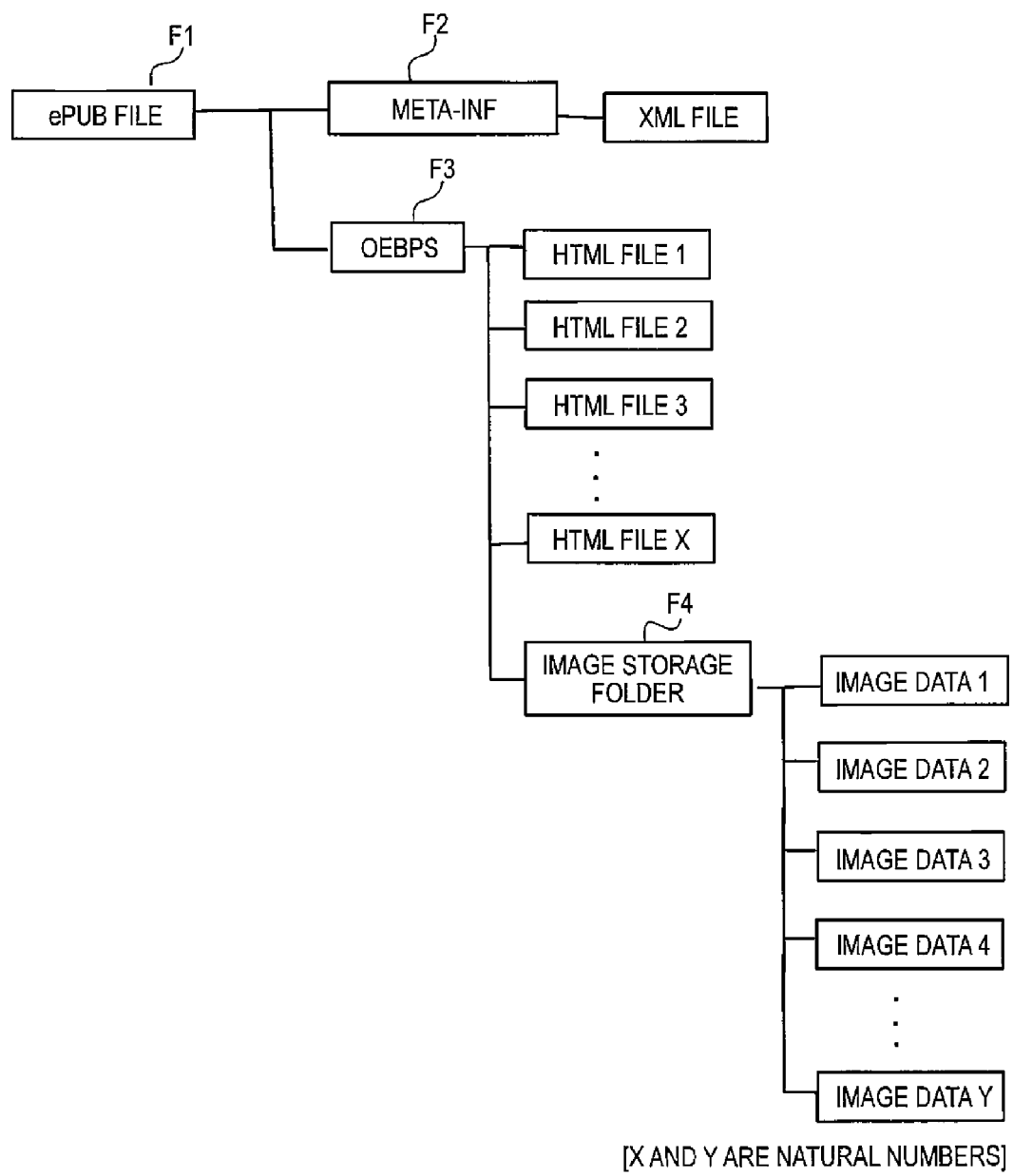
FIG. 2 is a diagram schematically illustrating the structure of an ePUB file.

The printer 20 according to this embodiment can use an ePUB file based on an e-book format standard to perform printing. The ePUB file is compressed in a predetermined format (for example, a Zip format). As shown in FIG. 2, an ePUB file F1 stores two folders, that is, a folder F2 that stores an xml file and a folder F3 that stores an HTML file and image data. Information related to chapters is described in the xml file stored in the folder F2. The folder F3 includes a plurality of (X) HTML files divided for each chapter and a folder F4 that stores a plurality of (Y) image data items used in the HTML file.

Next, the relation between the HTML file, which is document data, and the image data in the ePUB file will be described. As shown in FIG. 3, the source code of the HTML file in the ePUB file includes descriptions M1 and M3 that represent the content of a document and a description M2 that designates a path indicating the storage position of the image data. The document and image are output in the desired arrangement of the creator of the HTML file in the order in which M1, M3, and M2 are described in the source code.
(Image Deleting Method)

Next, a method of processing an image so as not to be represented in the HTML file when the image is output will be described.

As a method of deleting the description, the process shown in FIG. 4 is performed. Specifically, the CPU 21 analyzes the source code of the HTML file and specifies a description that represents the image. For example, in the source code shown in FIG. 4, the CPU 21 searches for a character string starting from a character string [img src]. The character string [img src] means a command to output image data.

As the search result, when the character string [img src] is found, the CPU 21 deletes a specific character string including [img src]. Specifically, as shown in FIG. 4, a description from a <p> tag to a </p> tag is deleted. Then, an HTML file from which the description has been deleted is created. As a result, when an ePUB file is actually printed, the deleted image is not represented during printing.

After the specific character string is deleted, the CPU 21 creates a print image on the basis of the created HTML file.
(Operation of Printer)

Figure 5:
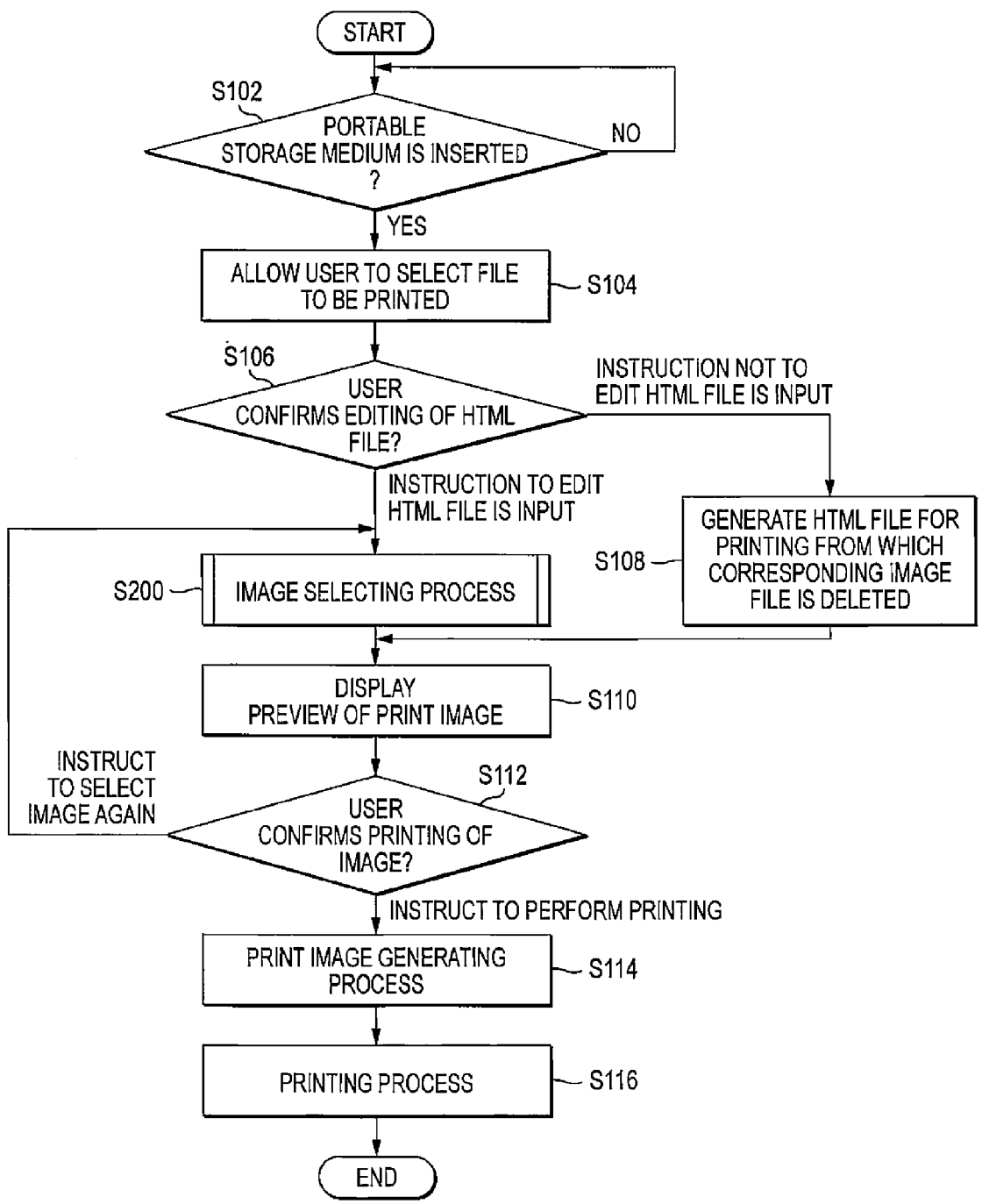
FIG. 5 is a flowchart illustrating the entire image editing process.

Next, the flow of the image editing process of the CPU 21 of the printer 20 deleting an image from the HTML file and performing printing will be described with reference to the flowchart shown in FIG. 5. FIG. 5 is a flowchart illustrating the entire image editing process. In the process shown in FIG. 5, Steps S102 to S112 correspond to the process performed by the editing program according to this embodiment.

The image editing process shown in FIG. 5 starts when the user inserts a portable memory, such as a USB memory, into the printer 20 (S102).

Figure 6:
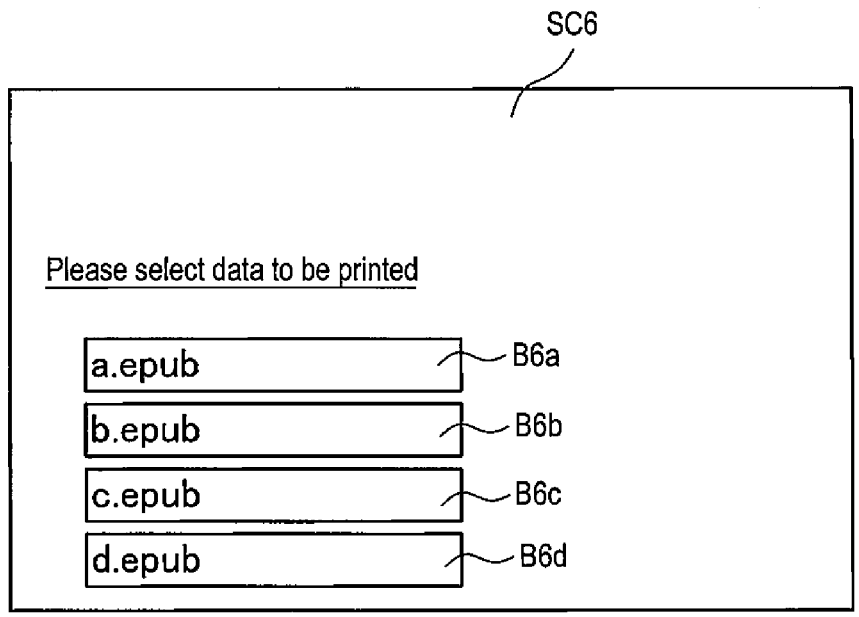
FIG. 6 is a diagram illustrating a screen that allows the user to select data to be printed.

When a portable storage medium is inserted into the printer, the CPU 21 reads a plurality of ePUB files stored in the medium. At that time, a document data selection screen SC6 shown in FIG. 6 is displayed on the display unit 25 of the printer 20 (S104). As shown in FIG. 6, the names of the ePUB files are displayed so as to correspond to a plurality of buttons B6a to B6d on the selection screen SC6. The user presses the buttons B6a to B6d to select a desired ePUB file to be printed.

Figure 7:
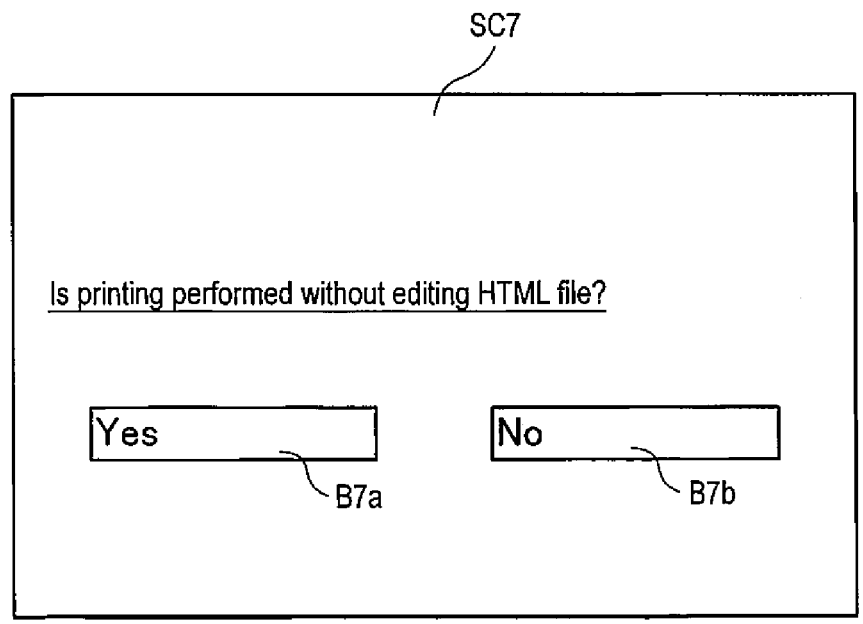
FIG. 7 is a diagram illustrating a screen that allows the user to select whether to edit the HTML file.

When the user selects a desired ePUB file on the selection screen SC6, the CPU 21 outputs, to the display unit 25, a screen SC7 that allows the user to confirm whether to perform printing without editing the HTML file, as shown in FIG. 7 (S106).

When a "YES" button B7a is pressed on the screen SC7, that is, when the user inputs an instruction to perform printing without editing the HTML file (S106: YES), the CPU 21 generates a print image on the basis of the HTML file, without editing the HTML file included in the ePUB file (S116) and prints the print image (S118). That is, the CPU 21 performs printing without changing the description of the source code of the HTML file.

When a "NO" button B7b is pressed on the screen SC7, that is, when the editing of the HTML file is selected (S106: NO), the CPU 21 performs an image selecting process (S200).
(Image Selecting Process)

Figure 8:
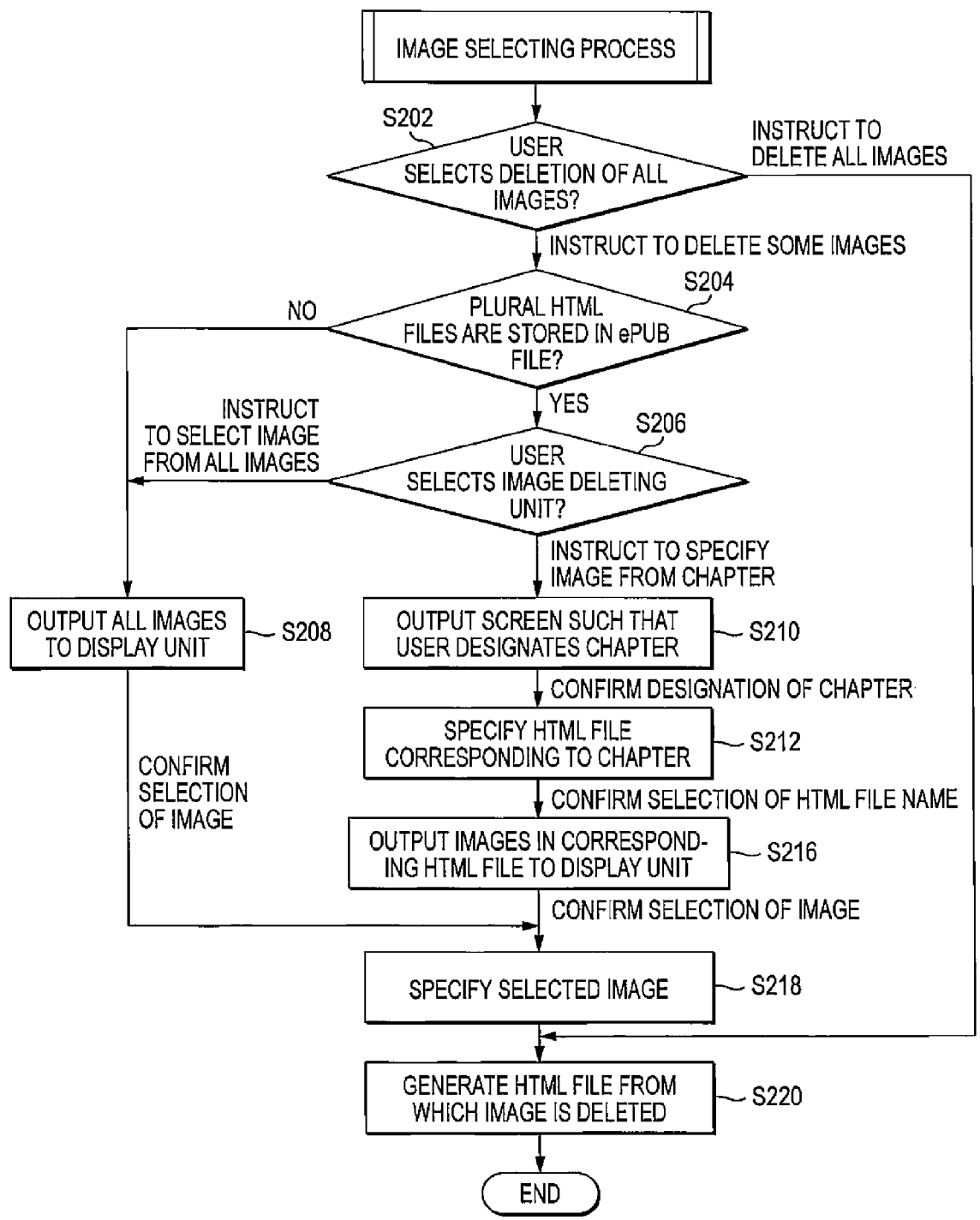
FIG. 8 is a flowchart illustrating an image selecting process.

FIG. 8 is a flowchart illustrating the image selecting process performed in Step S200 of FIG. 5.

Figure 9:
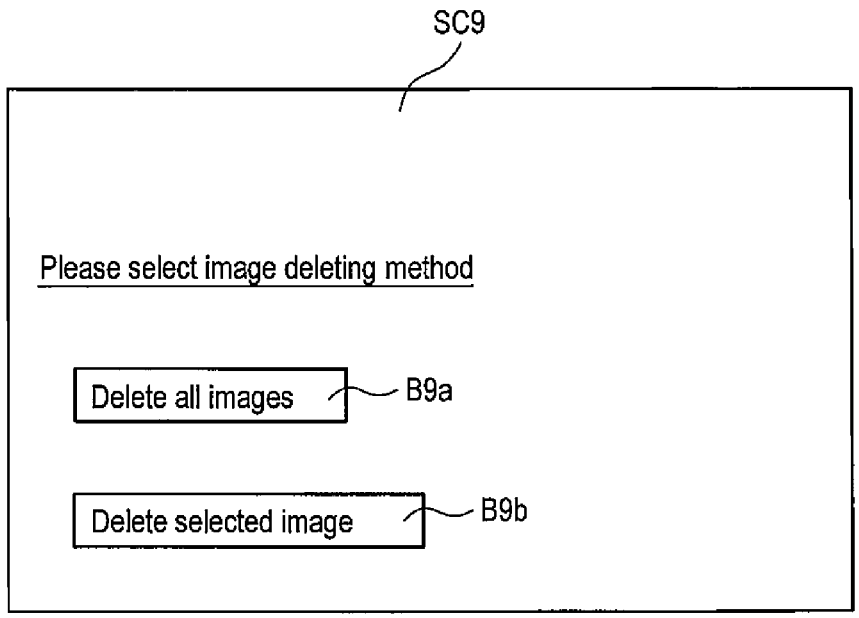
FIG. 9 is a diagram illustrating a screen that allows the user to select an image deleting method.

First, the CPU 21 outputs a selection screen SC9 shown in FIG. 9 to the display unit 25 (S202). The user selects an item displayed on the screen SC9 to select whether to delete all images in the ePUB file. That is, the user selects whether to press a button B9a to delete all images in the ePUB file or press to a button B9b to selectively delete the images in the ePUB file.

When the user presses the button B9a, the CPU 21 generates an HTML file from which all images in the ePUB file have been deleted (S218). Specifically, the CPU 21 analyses all HTML files in the ePUB file and generates an HTML file from which a description representing the images, that is, the description M2 shown in FIG. 3 has been deleted.

When the user presses the button B9b, the CPU 21 determines whether a plurality of HTML files are included in the ePUB file (S204). This determination is performed by decompressing the ePUB file and counting the number of HTML files in the folder F3 shown in FIG. 2.

Figure 10:
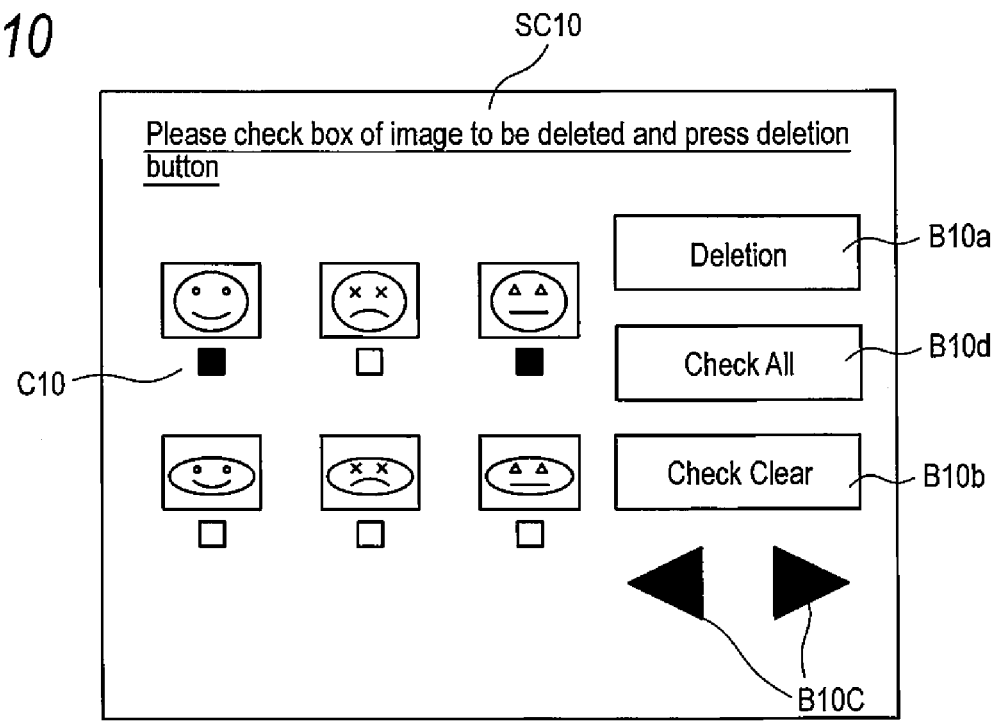
FIG. 10 is a diagram illustrating a screen that allows the user to select an image to be deleted from the images in a file.

When it is checked that only one HTML file is included in the ePUB file (S204: NO), the CPU 21 generates a list screen SC10 indicating all image groups included in the folder F4, as shown in FIG. 10, and outputs the screen SC10 to the display unit 25 (S208). Specifically, the CPU 21 analyzes the HTML file and searches for descriptions, such as the description M2 shown in FIG. 3. Then, the CPU 21 extracts all image data corresponding to all of the searched descriptions from the folder F4, generates the list screen SC10 indicating all images, and outputs the list screen SC10 to the display unit 25. Each of the images displayed on the list screen SC10 is a reduced image.

The user selects at least one image that the user wants to delete from a plurality of images on the list screen SC10 and presses a deletion button. Specifically, the user selects the check boxes C10 of all of the images that the user wants to delete and presses a deletion button B10a. The list screen SC10 includes a button B10b for selecting an image and a screen slide button B10c for changing the list screen when a plurality of images are displayed over a plurality of list screens.

In addition, the list screen SC10 includes a button B10d for selecting the check boxes C10 of all images. The user can press the button B10d to reduce the time and effort to separately select the images.

The CPU 21 specifies the image which is designated to be deleted by the user, that is, the image with the check box C10 which is selected by the user on the list screen SC10 (S218). Specifically, the CPU 21 specifies the data name of the image data indicating the selected image. The CPU 21 performs the above-mentioned process to delete the description for representing the image corresponding to the specified image data name from the HTML file and generates a new HTML file in which the specified image is not represented (S220).

Figure 11:
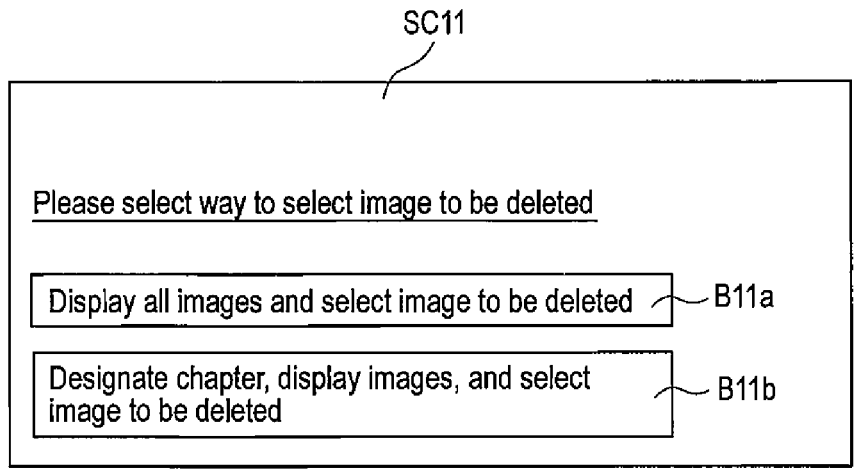
FIG. 11 is a diagram illustrating a screen that allows the user to select a method of selecting the image to be deleted.

When it is checked in Step S204 of FIG. 8 that a plurality of HTML files are included in the ePUB file, the CPU 21 outputs a screen SC11 shown in FIG. 11 to the display unit 25 such that the user selects a way to select the image to be deleted from two items (S206).

The screen SC11 includes two buttons. A first button B11a is for displaying the image groups included in all the chapters on the screen such that the user can select the image. The second button B11b is for displaying the image groups corresponding to one chapter such that the user can select the image. One HTML file is associated with one chapter.

When the button B11a is pressed on the screen SC11, that is, when a method of selecting the image from the image groups included in all chapters once is selected, the CPU 21 displays a list of the image groups included in all of the HTML files in the ePUB file on the display unit 25, as shown in FIG. 10 (S208). Specifically, the CPU 21 analyzes each HTML file in the ePUB file and searches for the description M2 shown in FIG. 3. Then, the CPU 21 extracts the images corresponding to all of the searched descriptions M2 shown in FIG. 3 from the storage area of the folder F4 and outputs the images as a list of reduced images to the display unit.

Similarly to the above-mentioned process, the user selects the check box C10 of at least one image that the user wants to delete and presses the deletion button B10a on the selection screen SC10.

The CPU 21 specifies the image which is designated to be deleted from the displayed list of the images by the user, that is, the image whose check box C10 is selected (S218). Then, the CPU 21 deletes the description representing the specified image from the HTML file and generates a new HTML file in which the selected image is not represented, as in the above-mentioned process (S220).

Figure 12:
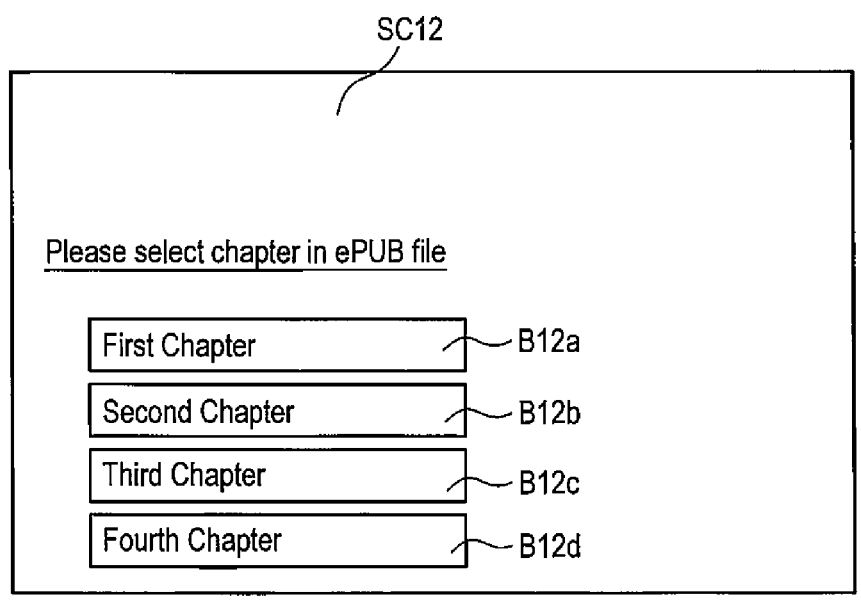
FIG. 12 is a diagram illustrating a screen that allows the user to select a chapter.

When the button B11b is pressed on the screen SC11, that is, when the user selects a method of displaying the images corresponding to the chapter and selecting the image, the CPU 21 outputs, to the display unit 25, the screen SC12 that allows the user to select the chapter, as shown in FIG. 12 (S210). Specifically, the CPU 21 analyzes the XML file included in the folder F2 shown in FIG. 2 and acquires information related to the chapter. The user presses the button corresponding to the chapter that the user wants to edit among the buttons B12a to B12d shown on the selection screen SC12. When the chapter is selected by the user, the CPU 21 analyzes the source code of the XML file to specify the HTML file corresponding to the chapter (S212).

Then, as shown in FIG. 10, the CPU 21 displays a list of the image groups included in all HTML files in the ePUB file on the display unit 25 (S208). Specifically, the CPU 21 analyzes the HTML file and searches for the description M2 shown in FIG. 3. Then, the CPU 21 extracts the images corresponding to all of the searched descriptions M2 from the storage area of the folder F4 and outputs the images as a list of reduced images to the display unit.

Similarly to the above-mentioned process, the user selects the check box C10 of at least one image that the user wants to delete and presses the deletion button B10a on the selection screen SC10.

The CPU 21 specifies the image which is designated to be deleted from the displayed list of the images by the user, that is, the image whose check box C10 is selected (S218). Then, the CPU 21 deletes the description representing the specified image from the HTML file and generates a new HTML file in which the selected image is not represented, as in the above-mentioned process (S220).

When the generation of the new HTML file is completed in Step S200, the new HTML file is temporarily stored in the folder F3 in FIG. 2. Then, the following Steps S110 to S116 are performed on an HTML file when the HTML file is not edited or a new edited HTML file when the HTML file is edited.

Figure 13:
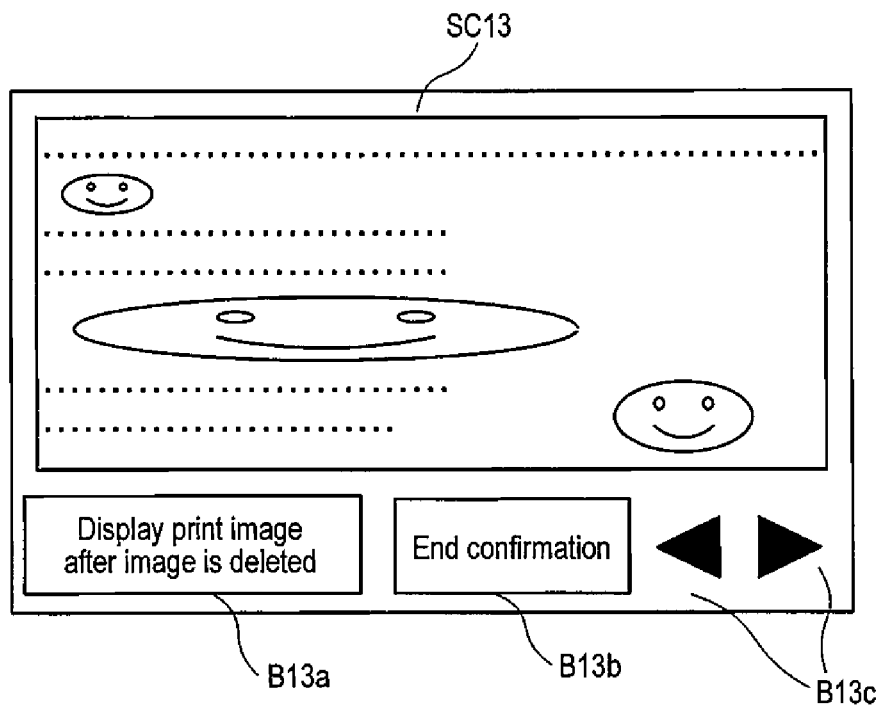
FIG. 13 is a diagram illustrating a print preview display screen before an image is deleted.
Figure 14:
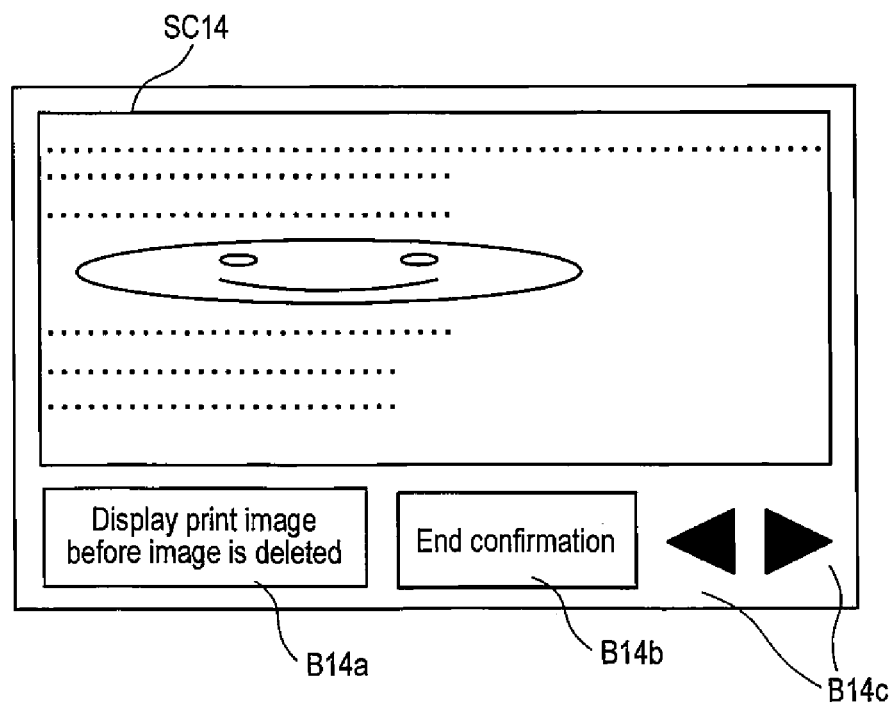
FIG. 14 is a diagram illustrating a print preview display screen after an image is deleted.

In this way, when the image selecting process in Step S200 of FIG. 8 is completed, the CPU 21 outputs a preview image represented by the HTML file generated in FIG. 8 to the display unit 25 in Step S110 of FIG. 5, as shown in FIGS. 13 and 14. When the image which is selected to be deleted by the user is in some of a plurality of HTML files, the CPU 21 displays only the print preview of the HTML files including the deleted image.

FIG. 13 shows a print image based on the HTML file before editing is performed such that the image is not represented. FIG. 14 shows a print image based on the HTML file after the editing is performed. When a button B13a in a screen SC13 shown in FIG. 13 is pressed, a screen SC14 shown in FIG. 14 is displayed. When a button B14a in the screen SC14 shown in FIG. 14 is pressed, the screen SC13 shown in FIG. 13 is displayed. The user can press a button B14c to scroll a preview image in the screen SC14.

Figure 15:
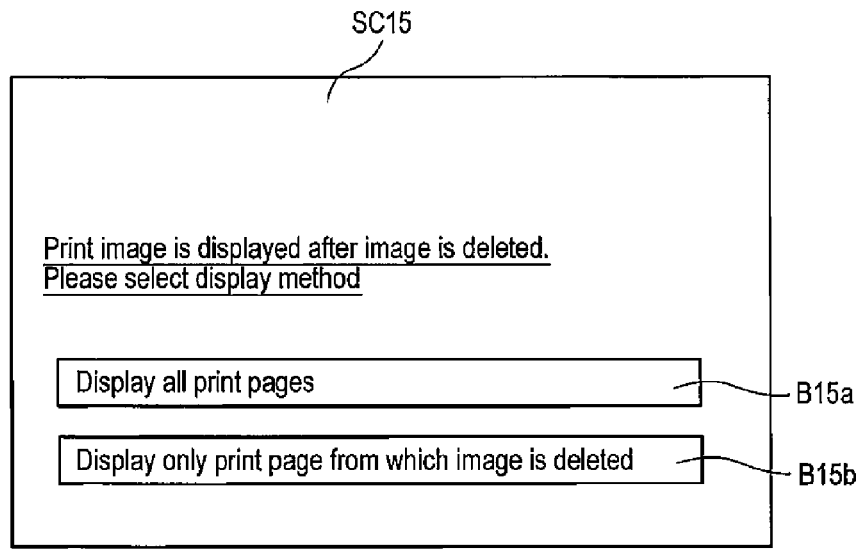
FIG. 15 is a diagram illustrating a screen for selecting the display of a print preview according to a modification.

In this embodiment, in Step S110, the print preview of only the HTML file from which the image has been deleted is displayed. However, a screen SC15 shown in FIG. 15 may be output to the display unit 25 such that the user selects a method of displaying the print preview of all HTML files or a method of displaying only the print preview of the HTML file from which the image has been deleted.

Figure 16:
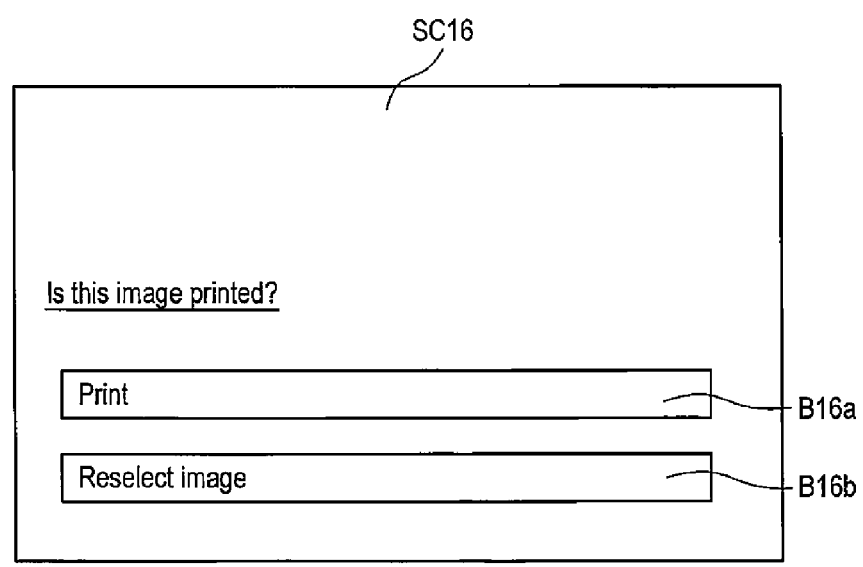
FIG. 16 is a diagram illustrating a screen that allows the user to select whether to perform printing.

When the user presses the button B13b shown in FIG. 13 or the button B14b shown in FIG. 14, that is, when the user inputs an instruction to end the confirmation of the preview image, the CPU 21 outputs a screen SC16 shown in FIG. 16 to the display unit 25 such that the user selects whether to print the image in the displayed print preview (S114).

When the user presses a button B16a, that is, when the user inputs an instruction to perform printing, the CPU 21 creates print data with an HTML file when the HTML file is not edited or a new edited HTML file when the HTML file is edited (S114). After the print image is created, the printing unit 24 prints the image (S116) and the process shown in FIG. 5 ends.

When the user presses a button B16b, that is, when an instruction to reselect the image to be deleted is input, the CPU 21 returns the process to Step S200 and outputs the display shown in FIG. 6 again.

In the above description, in the editing program executed by the CPU 21, Step S200 in FIG. 5 corresponds to the process performed by a list screen creating unit according to the invention. Step S108 in FIG. 5 corresponds to the process performed by a data creating unit. Steps S104 and S106 in FIG. 5 correspond to the process performed by a selection allowing unit. Step S204 in FIG. 8 corresponds to the process performed by an information body acquiring unit. Step S210 in FIG. 8 corresponds to the process performed by a selecting unit. Step S110 in FIG. 5 corresponds to the process performed by a display generating unit.

The ePUB file corresponds to an information body according to the invention. All of the HTML files stored in the ePUB file correspond to first document data according to the invention. The HTML file generated in Step S220 of FIG. 18 corresponds to second document data according to the invention.

Other Embodiments (1) As described above, in the image deleting process (S200) shown in FIG. 5, the user selects the image to be deleted from an output document, as described with reference to FIG. 10. Alternatively, the user may select the image to remain in the output document.

(2) As described above, in this embodiment, the CPU analyzes the source code of the HTML file and extracts the image corresponding to the character string described in the source code from the folder F4 shown in FIG. 2. However, other structures may be used. That is, the CPU may output a list of all image groups in the folder F4 to the display unit 25, without analyzing the source code, such that the user selects an image from the image groups. In this case, the character string including the name of the image data selected by the user may be deleted from the source code so as not to be output.

(3) As described above, in this embodiment, the information body is described considering ePUB. An information body which is not subjected to a predetermined compression process may be used, unlike the ePUB file. That is, an HTML file used in a Web page may be used. In this case, components of the information body shown in FIG. 2 include one or a plurality of HTML files and the image folder F4.

Figure 17:
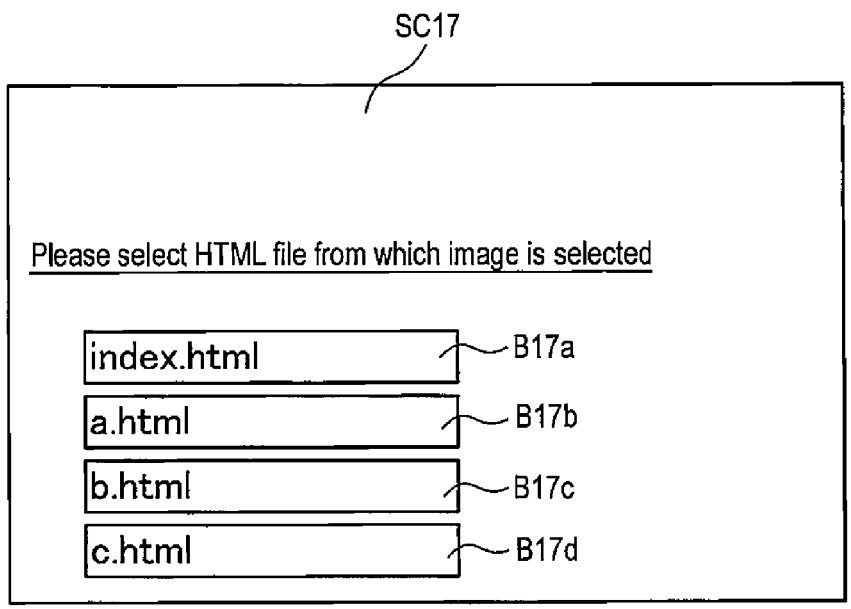
FIG. 17 is a diagram illustrating a screen that allows the user to select an HTML file according to a modification.

In the case of the Web page, a screen shown in FIG. 17 is output in Step S104 of FIG. 5. That is, the extension of the displayed information body is not ".ePUB", but is ".html" or ".htm".

Figure 18:
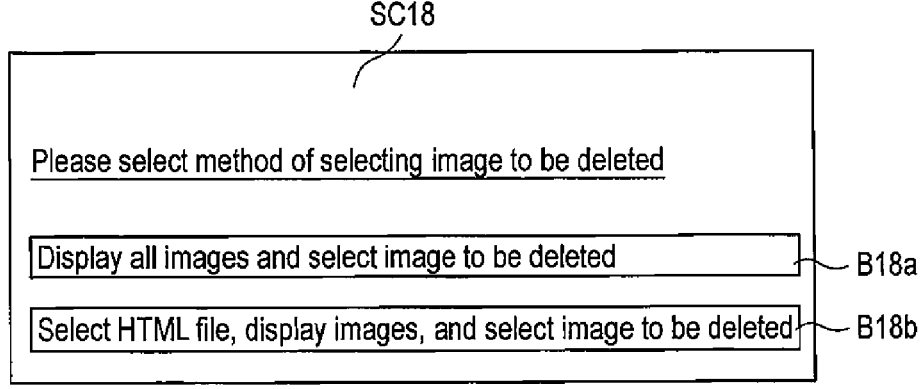
FIG. 18 is a diagram illustrating a screen that allows the user to select a method of selecting the image to be deleted according to a modification.

As shown in FIG. 18, the item selected in Step S206 of FIG. 8 is B18a or B18c. That is, the user selects whether to delete the images in all HTML files or to selectively delete the image in a specific HTML file.

Figure 19:
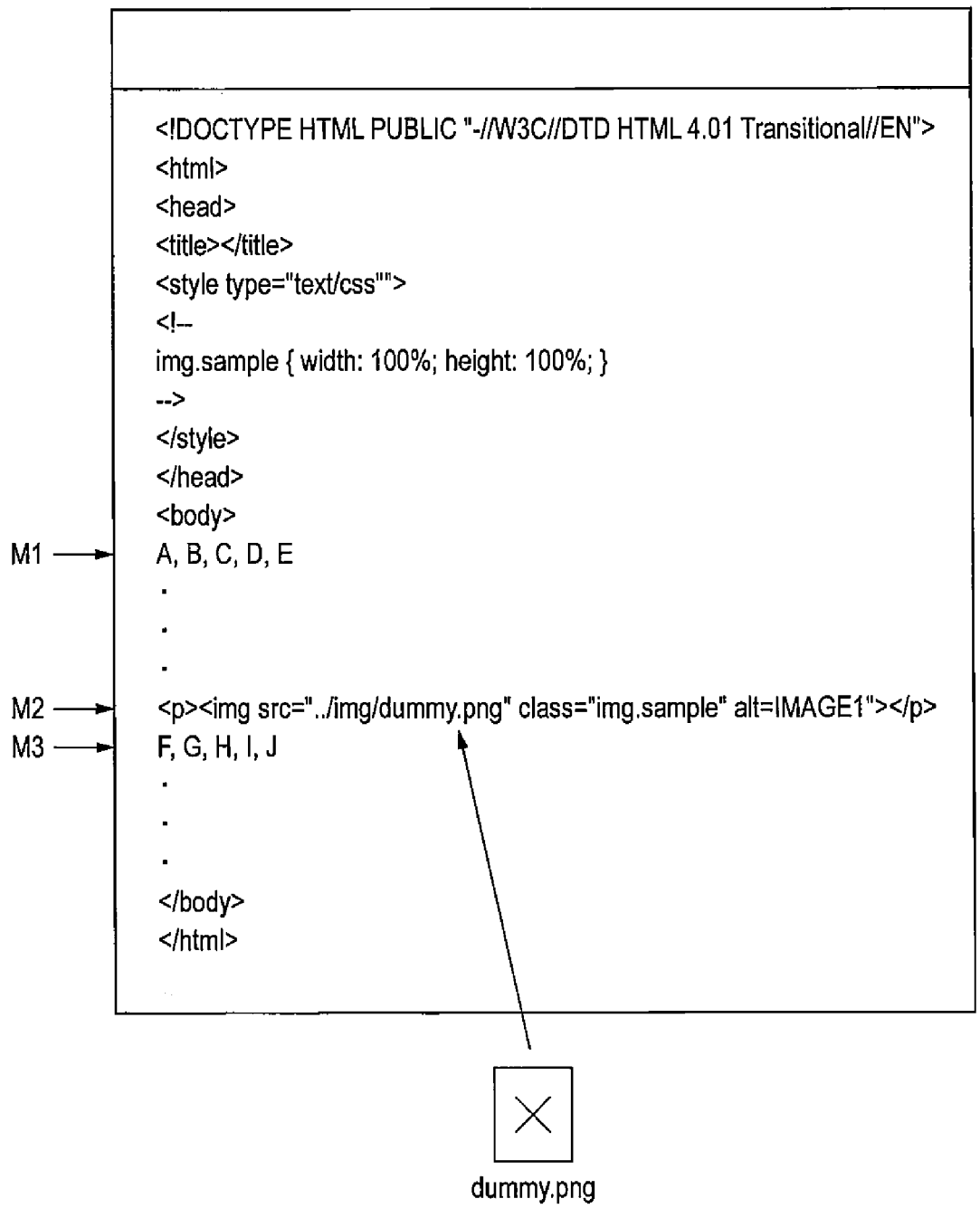
FIG. 19 is a diagram illustrating a file structure according to a modification in which a character string is edited such that an image is not represented in an HTML file.

(4) As the method of deleting the image from the HTML file, the HTML file is analyzed and the description representing the image is deleted. However, this method is illustrative. For example, as shown in FIG. 19, the description may be changed to a description for inserting a different image, such as an image represented by a mark X. In this case, an image indicating the mark X is stored in the NVRAM 23 of the printer 20 in advance and the description representing the image that the user wants to delete in the HTML file is replaced with a description shown in FIG. 18 in the row M2. In this way, it is possible to delete the image.

As the method of deleting the image from the HTML file, an image size may be changed such that the image is not represented during output. That is, in the row M4 of FIG. 3, the values of a "width" and a "height" may be changed to 0% to remove the image.

(5) In the ePUB file, one HTML file is associated with one chapter. However, it is assumed that there is an ePUB file with a different structure. For example, it is assumed that a plurality of HTML files are used to represent one chapter. In this case, when the user designates a chapter, a list of the images used in the corresponding plurality of HTML files is displayed on the display unit 25.

(6) In this embodiment, after the HTML file from which the description M2 shown in FIG. 2 is deleted is created and print data is output, the HTML file is not stored. However, other structures may be used. That is, the HTML file in which the deleted image is not represented may be stored instead of the HTML file before the description M2 is deleted, thereby creating a new ePUB file.

(7) In this embodiment, when an image is displayed, the image is displayed on the panel of the printer. However, the printer and a terminal apparatus may be connected to each other through the network and a display of the terminal apparatus may be used as the display unit.

What is claimed is:

1. An information processing apparatus comprising:
a processor; and
memory storing computer readable instructions that, when executed by the processor, cause the apparatus to:
analyze a first document data which is described in a markup language and represents a sentence and a plurality of images when the first document data is output, to create a list screen such that the list screen includes the plurality of images and does not include the sentence of the first document data;
display the list screen on a display unit;
receive a selection input selecting any of the plurality of images through the list screen; and
when receiving the selection input through the list screen, process the first document data to create a second document data which is described in a markup language based on the received selection input, such that the second document data represents the sentence and the plurality of images of the first document data except for at least one of the plurality of images included in the list screen and selected through the list screen when the second document data is output.

2. The information processing apparatus according to claim 1, wherein the computer readable instructions further cause the apparatus to create the second document data in which all of the plurality of images in the list screen created by the list screen creating unit are not represented when the second document data is output, in response to an instruction input.

3. The information processing apparatus according to claim 1, wherein the computer readable instructions further cause the apparatus to:
acquire an information body including a plurality of document data items which are described in the markup language and represent a sentence and a plurality of images when the document data items are output and a plurality of image data items which represent the plurality of images; and
select the first document data from the plurality of document data items included in the information body, in response to an instruction input.

4. The information processing apparatus according to claim 3,
wherein the plurality of image data items correspond to a plurality of chapters, and
wherein one first document data item corresponding to one chapter is selected from the plurality of document data items corresponding to the plurality of chapters.

5. The information processing apparatus according to claim 3, wherein the information body is a compressed file which is compressed in a predetermined format.

6. The information processing apparatus according to claim 1, wherein the computer readable instructions further cause the apparatus to:
generate a preview image of the second document data and display the preview image on the display unit.

7. The information processing apparatus according to claim 1, wherein the list screen displayed on the display unit is created such that the plurality of images are arranged in a predetermined layout.

8. The information processing apparatus according to claim 7, wherein the list screen displayed on the display unit is created such that the plurality of images are arranged in a first direction in the predetermined layout.

9. The information processing apparatus according to claim 8, wherein the list screen displayed on the display unit is created such that the plurality of images are arranged in the first direction and a second direction orthogonal to the first direction in the predetermined layout.

10. A non-transitory computer readable medium storing a program that, when executed by a processor, causes a computer to:
analyze a first document data which is described in a markup language and represents a sentence and a plurality of images when the first document data is output, to create a list screen such that the list screen includes the plurality of images and does not include the sentence of the first document data;
display the list screen on a display unit;
receive a selection input selecting any of the plurality of images through the list screen; and
when receiving the selection input through the list screen, process the first document data to create a second document data which is described in a markup language based on the received selection input, such that the second document data represents the sentence and the plurality of images of the first document data except for at least one of the plurality of images included in the list screen and selected through the list screen when the second document data is output.

11. An information processing apparatus comprising:
a processor; and
memory storing computer readable instructions that, when executed by the processor, cause the apparatus to:
acquire an information body including a first document data which is described in a markup language and represents a sentence and a plurality of images when the first document data is output, and a plurality of image data items representing the plurality of images,
read the plurality of image data items included in the information body to create a list screen such that the list screen includes the plurality of images and does not include the sentence of the first document data;
display the list screen on a display unit;
receive a selection input selecting any of the plurality of images through the list screen; and
when receiving the selection input through the list screen, process the first document data to create a second document data which is described in a markup language based on the received selection, such that the second document data represents the sentence and the plurality of images of the first document data except for at least one of the plurality of images included in the list screen and selected through the list screen when the second document data is output.

12. The information processing apparatus according to claim 11, wherein the computer readable instructions further cause the apparatus to create the second document data in which all of the plurality of images in the list screen created by the list screen creating unit are not represented when the second document data is output, in response to an instruction input.

13. The information processing apparatus according to claim 11, wherein the computer readable instructions further cause the apparatus to:
acquire an information body including a plurality of document data items which are described in the markup language and represent a sentence and a plurality of images when the document data items are output and a plurality of image data items which represent the plurality of images; and
select the first document data from the plurality of document data items included in the information body, in response to an instruction input.

14. The information processing apparatus according to claim 13,
wherein the plurality of image data items correspond to a plurality of chapters, and
wherein one first document data item corresponding to one chapter is selected from the plurality of document data items corresponding to the plurality of chapters.

15. The information processing apparatus according to claim 13, wherein the information body is a compressed file which is compressed in a predetermined format.

16. The information processing apparatus according to claim 11, wherein the computer readable instructions further cause the apparatus to:

generate a preview image of the second document data and display the preview image on the display unit.

* * * * *